United States Patent [19]

Signoretto

[11] Patent Number: 4,800,406

[45] Date of Patent: Jan. 24, 1989

[54] APPARATUS FOR CREATING AND CHECKING CORRELATION BETWEEN NEGATIVES AND PRINTS IN PHOTOGRAPHIC LABORATORIES

[75] Inventor: Roberto Signoretto, Olmo Di Martellago, Italy

[73] Assignee: Photo Engineering International S.R.L., Venice, Italy

[21] Appl. No.: 927,170

[22] Filed: Nov. 5, 1986

[30] Foreign Application Priority Data

Nov. 11, 1985 [IT] Italy ............................... 84154 A/85

[51] Int. Cl.[4] ....................... G03B 17/24; G03B 27/32; G03B 27/52

[52] U.S. Cl. ...................................... 354/105; 355/40; 355/77

[58] Field of Search .................. 354/105, 109; 355/40, 355/70

[56] References Cited

U.S. PATENT DOCUMENTS 3,750,553 8/1973 Pfeifer et al. ........................ 354/105
3,836,246 9/1974 Bowker ............................. 355/40 X
3,987,467 10/1976 Cowles ................................ 354/105
4,384,786 5/1983 Kuroda ................................. 355/40
4,554,560 11/1985 Kanaoka et al. ................ 354/105 X
4,574,692 3/1986 Wahli .............................. 354/105 X

*Primary Examiner*—Donald A. Griffin
*Attorney, Agent, or Firm*—Charles W. Fallow; Martin P. Hoffman; Mitchell B. Wasson

[57] ABSTRACT

An apparatus for creating and checking correlation between negatives and prints in photographic laboratories comprising:

means (3) for marking each film (5) with a number (4) written in machine-readable code, a reader (7) for said number (4) in the printing station (6), in the printing station (6), a printer (8) for reproducing said number (4) in the interspace (10) between two adjacent prints, in the finishing station (13), a reader (16) for the number (4) marked on each film (5)

in the finishing station (13), a reader (17) for the corresponding number (12), and a circuit (18) which, during the cutting stage checks correspondence between the two numbers (4,12).

7 Claims, 2 Drawing Sheets

APPARATUS FOR CREATING AND CHECKING CORRELATION BETWEEN NEGATIVES AND PRINTS IN PHOTOGRAPHIC LABORATORIES

This invention relates to a method for creating and checking correlation between negatives and prints in photographic laboratories, and an apparatus for implementing the method.

Exposed films are currently developed and printed in photographic laboratories. In practice, the photographer customer hands the exposed film to the shop for development and printing, and the shop delivers it to the photographic laboratory together with the films received from other photographer customers, each previously inserted in an envelope known as the "processing envelope".

These films together with films originating from other shops are there extracted from the relative holder joined together to form a continuous strip (film reel), developed together, printed together on a continuous strip of photographic paper, then cut into individual photographs and finally reinserted, together with the negatives separated from the film reel, into the original processing envelope to be returned to the shops from which they originated.

The considerable problem which normally arises in this type of processing is, after this series of operations, to return to the customer his own negatives and the photographs printed from them.

In other words, this means reinserting into the processing envelope the negatives and positives corresponding to the holder originally inserted into that envelope by the shopkeeper. As in practice the average number of films processed daily by a laboratory is of the order of same thousands, it is immediately apparent that the problem of film-photograph-processing envelope correlation is a problem of such importance that if no solved it can give rise to extreme difficulties and responsibilities.

Apparatus has already been proposed for establishing correlation between the negatives and respective processing envelopes at the moment in which these are separated from each other at their entry into the photographic laboratory, and for then cheking this correspondence in the finishing station, ie at their exit from the photographic laboratory when the developed negatives and the printed photographs have to be inserted into each envelope.

In particular, apparatus has been already been proposed which enable this correspondence to be automatically established and checked, and provide a signal if it is not confirmed.

For checking the correspondence between photographs and negatives, apparatus exist which display on one and the same screen the photographs televised by a telecamera and the corresponding negatives also televised by a telecamera, to allow direct comparison by the operator.

The drawback of such apparatus is that the correspondence check is visual and as such is slow, requires the constant presence of the operator and is often influenced by his tiredness.

To obviate this drawback an apparatus has already been proposed, for the specific case of photographic films on disc, which automatically reads the bar code printed on the disc, and during the printing of the photograph reproduces this bar code on the rear of a photograph of each order, so allowing the number thus printed and the number present on the disc to be automatically read and compared in the finishing station.

The drawback of this method is that printing the number in bar code on the rear of the photograph requires the use of a thermal transfer printer, ie an apparatus which besides being costly and of complex operation cannot be made to operate directly on the polyethylene coating which normally forms the lower layer of the paper. For this reason it has been proposed to interpose between the thermal printer and the photographic paper a carbon ribbon on which said printer acts in order to transfer on to the photograph the numbers written in bar code.

The result is a further weight increase in the apparatus, the need to frequently replace the carbon ribbon which obviously wears, and an overall size such as to make it unsuitable for application to pre-existing apparatus.

The object of the invention is to obviate these drawbacks and to finally and completely solve the problem of automatically establishing correspondence between films and photographs during developing and checking that this correspondence still exists during finishing.

According to the invention the problem is solved by a method for creating and checking correlation between negatives and prints in photographic laboratories, characterised by:

forming a continuous strip from the films pertaining to the different orders, and marking each film with a number written in machine-readable code, rading said number during the printing stage and reproducing it in machine-readable code in the interspace between two adjacent prints, and during the cutting stage, checking correspondence between the number marked on the negative and the number marked on the corresponding series of prints.

Again according to the invention, each film can be marked by applying to it a label on which said number is printed.

In a different embodiment of the invention, each film can be marked by numbering the actual label with wich the films are joined together.

Advantageously, a number corresponding to the number marked on each negative can be reproduced photographically on the paper strip transversely to the direction of advancement of said paper strip.

In an alternative embodiment, a number corresponding to the number marked on each negative can be reproduced photographically parallel to the direction of advancement of the paper strip, after having previously extended the interspace betweeen two adjacent prints.

To implement the method heretofore described, the invention provides for the use of an apparatus comprising:

means for making each film with a number written in machine-readable code, a reader for said number in the printing station, in the printing station, a printer for reproducing said number in the interspace between two adjacent prints, in the finishing station, a reader for the corresponding number reproduced on the prints, and a circuit which during the cutting stage checks correspondence between the two numbers.

A preferred embodiment of the invention is described hereinafter with reference to the accompanying drawings in which.

Figures 1, 2:
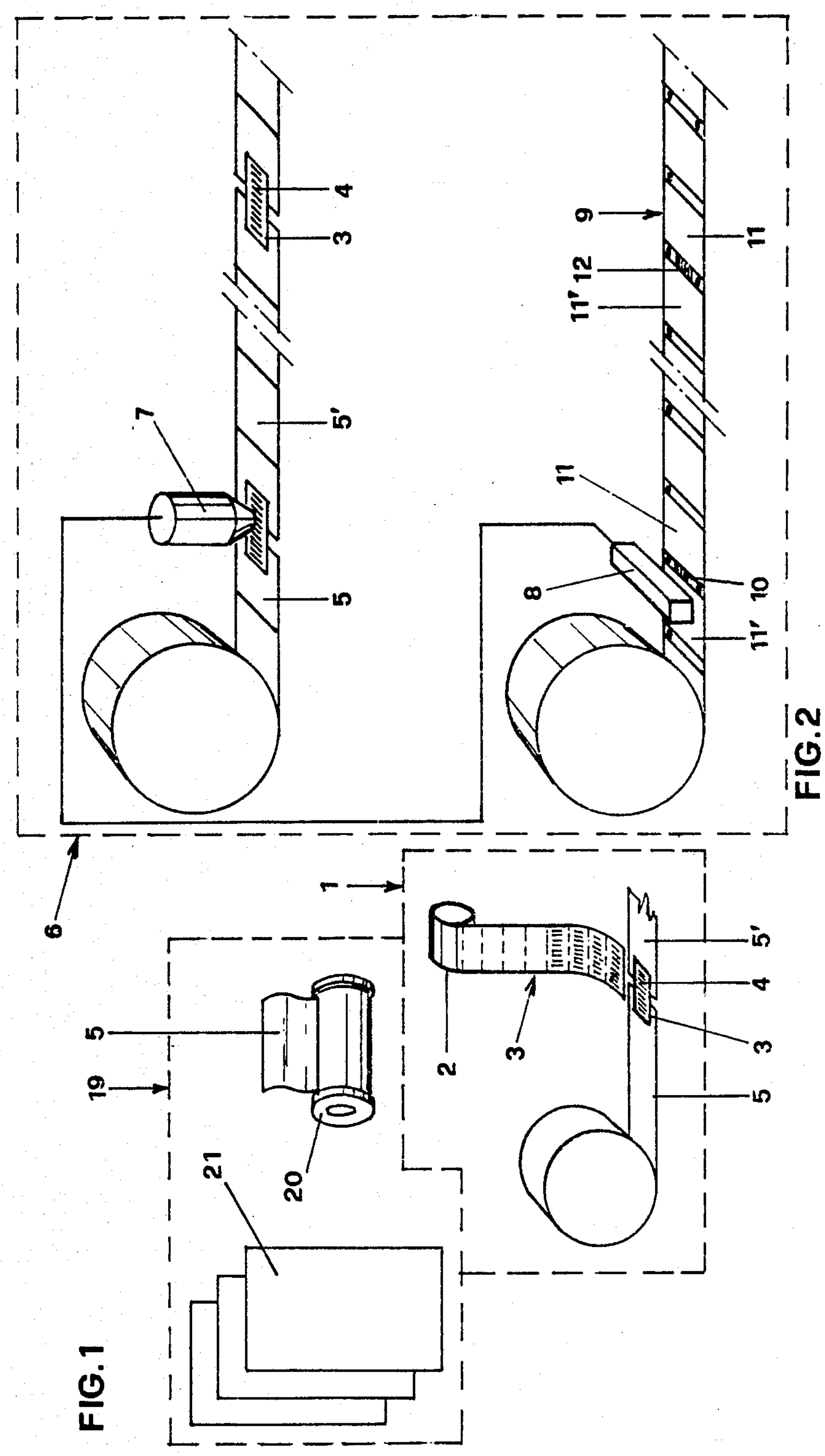
FIG. 1 is a diagrammatic view of the joining station of a photographic laboratory provided with the apparatus according to the invention.
FIG. 2 is a diagrammatic view of the printing station in which a part of the apparatus according to the invention is applied.

As can be seen from the figures, the apparatus according to the invention comprises in the joining station 1 a roll 2 of labels 3, on each of which there is printed a number 4 in bar code or other machine-readable code, and which are arranged to be applied between the adjacent ends of two photographic films 5, 5' pertaining to two different orders.

The apparatus also comprises, in the printing station 6, a reader 7 for the number 4 printed on the labels 3. By way of the necessary decoding and processing circuits, not shown on the drawings, the output of the reader 7 controls a photographic printer 8 arranged to print on the photosensitive paper 9, in the interspace 10 between the last print 11 of one order and the first print 11' of the next order, a machine-readable number 12 which is identical or in any event related to the number 4, and possibly with its decimal decoded value.

Figure 3:
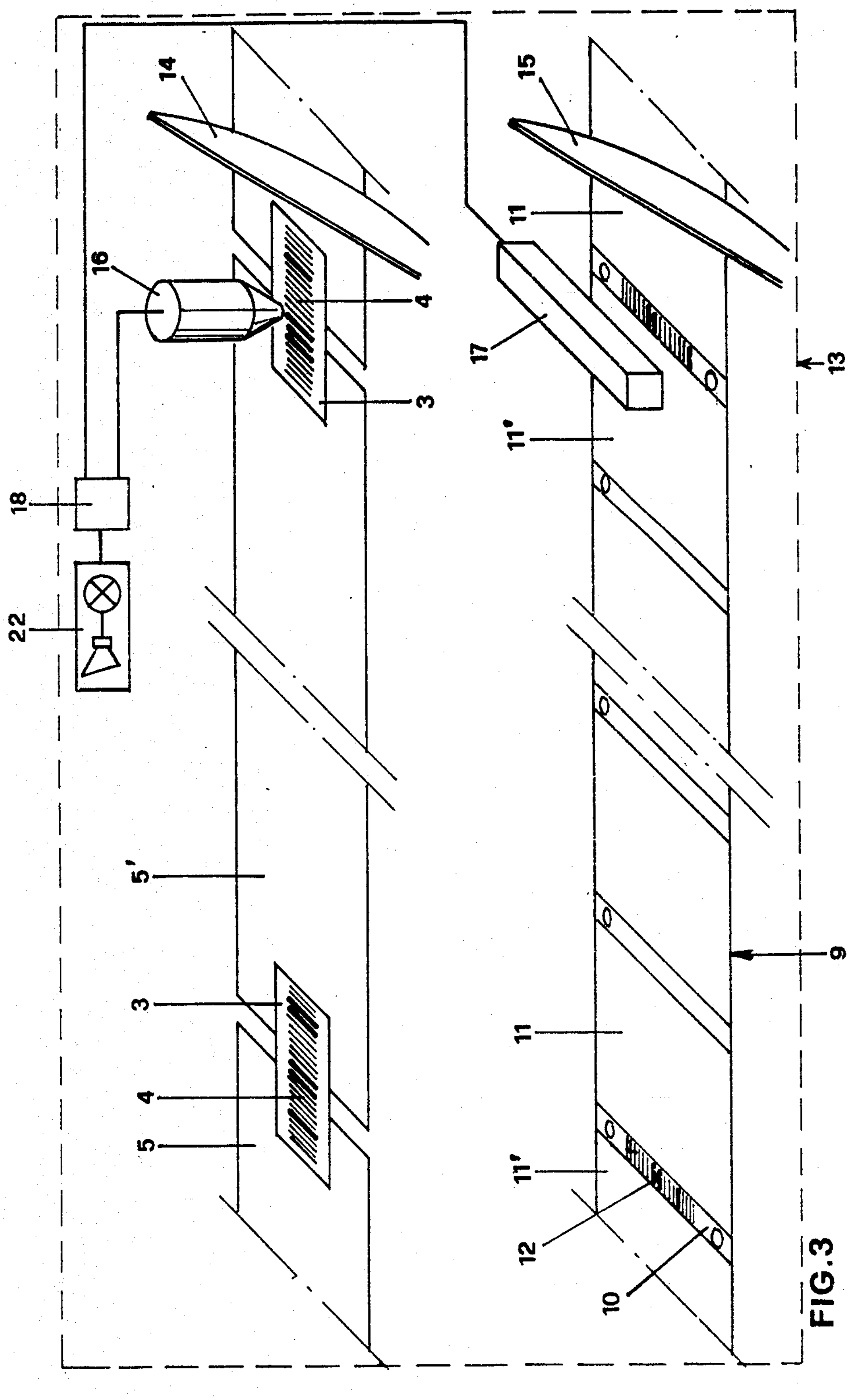
FIG. 3 is a diagrammatic view of the finishing station in which the remaining part of the apparatus including to the invention is applied.

This number can be reproduced transversely (see FIGS. 2 and 3) to the direction of advancement of the paper strip 9, or longitudinally after previously spacing the two photographs 11, 11' apart by any automatic means, and having thus "extended" the interspace 10 by the necessary amount to contain the number 12. In the finishing station 13, ie in the station comprising inter alia the negative cutter 14 and the print cutter 15, there are also provided according to the invention two readers 16 and 17 for the number 4 and 12 respectively, which mark that order. If the number 12 reproduced in the interspace 10 is printed transversely it is advantageous to use a scanning laser reader, whereas if said number is printed longitudinally a conventional fixed beam reader can be used. In all case the outputs of the two readers 16 and 17 are connected to a control logic circuit 18 which compares the two read signals.

The operation of the apparatus according to the invention is as follows:

the holder 20 containing the film 5 to be developed is removed from the processing envelope 21 in the photographic laboratory arrival station 19. The film 5 to be developed is then extracted from the holder 20 and joined to the preceding films with a label 3 provided with a number 4. This number, which is preferably progressive, is read by a reader (not shown on the drawings) and printed automatically on the processing envelope 21 in order to create between the negatives and envelopes a correlation which will accompany both until they are reunited in the finishing station 13.

The continuos strip formed from all the joined-together films 5 is then fed to the developing station and then to the printing station 6. In this, as the negative strip 5 and paper strip 9 advance, the images corresponding to the individual frames to be printed are projected on to the paper strip, which thus becomes sensitised. Simultaneously, in the interspace 10 between the last photograph 11 of one order and the first photograph 11' of the next order the printer 8 reproduces photographically in bar code or other machine-readable code a number 12 related to the number 4 read by the reader 7 from the label 3.

When the film strip 5 and print strip reach the finishing station 13, the two readers 16 and 17 read the numbers 4 and 12 and transmit them to the control logic circuit 18. In the absence of correspondence between these two it halts the machine operating cycle and activates an optical and/or acoustic alarm 22.

It should be noted that transversely printing the number 12 is advantageous in that it results in a smaller wastage of paper, but at the same time requires a scanning laser reader 17 in the finishing station 13. Longitudinal printing is on the other hand more disadvantageous in that it results in a greater wastage of paper and requires an automatic device for extending the interspace 10 between prints corresponding to two successive orders, but at the same time enables a normal fixed beam reader 17 to be used in the finishing station 13 and enables the customer to also receive, together with his negatives and prints, that paper portion on which the number 12 is printed together with its decimal decoded value for recognition of the order.

From the aforegoing it is apparent that the method and apparatus according to the invention finally and completely solve the problems of automatically correlating negatives, positives and processing envelopes in photographic laboratories. In this respect, correlation between negatives and envelopes could be established by conventional means, but the correlation which can now be established between positives and negatives allows complete and automatic control of the entire processing cycle. Moreover, the method and apparatus according to the invention do not in practise lengthen the processing cycle in that the number 12 corresponding to the number 4, which marks the negatives of the different orders, is printed on the paper strip 9 during the printing of the photographs.

Finally,, the apparatus according to the invention can be easily and rapidly fitted to already existing apparatus in photographic laboratories. In this respect most of the components with the exclusion substantially of the printer 8 and reader 17 are already present in conventional apparatus, and their modification requires substantially no more than the application of very few components and a few electrical connections.

I claim:

1. In a method for creating and verifying correlation between film negatives and prints in a photographic processor having a printing station at which prints are made on print medium from the negatives, and a finishing station at which negatives and prints are inserted into an envelope, said method comprising steps of joining adjacent pairs of filmstrips thus forming a continuous strip from the filmstrips pertaining to different orders by means of labels bearing machine-readable control numbers between adjacent film strips, reproducing each of said numbers onto the print medium at the printing station, checking the correspondence in the finishing station between the control number of each film and the number reproduced on the corresponding series of prints, and producing an error signal in the event of any lack of correlation, the improvement wherein in the reproducing step, the machine-readable control numbers on the labels are transferred to the print medium photographically.

2. A method as claimed in claim 1 characterised in that the number (12) corresponding to the number (4)

marked on each negative (5) is reproduced photographically on the paper strip (9), transversely to the direction of advancement of said paper strip.

3. A method as claimed in claim 1 characterised in that , the number (12) corresponding to the number (4) marked on each negative (5) is reproduced photographically on the paper strip (9) parallel to the direction of advancement of the paper strip.

4. A method as claimed in claim 3 characterised in that, before reproducing on the paper strip (9) the number (12) corresponding to the number (4) marked on each negative (5), the interspace (10) in which said number (12) is to be reproduced is extended.

5. An apparatus for implementing the method of claim 1, comprising a label applicator for joining adjacent filmstrips with labels preprinted with a first machine-readable control number, a first reader, in the printing station, for reading said number, a photographic printer, in the printing station, for reproducing the number on a space on the photosensitive print medium between two adjacent prints, a second reader, in the finishing station, for reading the second, corresponding number reproduced on the strip of prints, and a circuit for checking correlation between said first and second numbers and for signalling in the event of lack of correlation between the numbers.

6. An apparatus as claimed in claim 5, characterised in that the reader (7) is a scanning laser reader, arranged to read the number (12) reproduced in the interspace (10) transversely to the direction of advancement of the strip of prints (9).

7. An apparatus as claimed in claim 5 characterised in that the reader (7) is a fixed beam reader arranged to read the number (12) reproduced in the interspace (10) parallel to the direction of advancement of the strip of prints (9).

* * * * *